(12) United States Patent
Wuensche et al.

(10) Patent No.: US 11,211,658 B2
(45) Date of Patent: Dec. 28, 2021

(54) BATTERY HOUSING COMPRISING ABSORBENT LAYER AND INSULATION FILM

(71) Applicant: Samsung SDI Co., Ltd., Yongin-si (KR)

(72) Inventors: Ralph Wuensche, Graz (AT); Thomas Trathnigg, Graz (AT); Guido Poscharnig, Stattegg (AT); Wolfgang Luidold, Donnersbach (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 110 days.

(21) Appl. No.: 16/475,516

(22) PCT Filed: Jan. 15, 2018

(86) PCT No.: PCT/KR2018/000675
§ 371 (c)(1),
(2) Date: Jul. 2, 2019

(87) PCT Pub. No.: WO2018/139789
PCT Pub. Date: Aug. 2, 2018

(65) Prior Publication Data
US 2019/0326571 A1 Oct. 24, 2019

(30) Foreign Application Priority Data
Jan. 26, 2017 (EP) ..................... 17153287
Jan. 9, 2018 (KR) .................. 10-2018-0002985

(51) Int. Cl.
*H01M 50/20* (2021.01)
*H01M 10/613* (2014.01)
(Continued)

(52) U.S. Cl.
CPC ....... *H01M 50/20* (2021.01); *H01M 10/4207* (2013.01); *H01M 10/482* (2013.01);
(Continued)

(58) Field of Classification Search
CPC . H01M 2/1077; H01M 10/613; H01M 10/625
See application file for complete search history.

(56) References Cited

U.S. PATENT DOCUMENTS 3,615,849 A * 10/1971 Hall .................. H01M 8/00
429/435
5,817,434 A * 10/1998 Brooker ............ H01M 10/6557
429/49
(Continued)

FOREIGN PATENT DOCUMENTS

| CN | 103917394 A | 7/2014 |
|---|---|---|
| CN | 103972428 A | 8/2014 |

(Continued)

OTHER PUBLICATIONS

Office action issued in European Patent Application No. 17 153 287.2, dated Sep. 12, 2018, 4pp.
(Continued)

*Primary Examiner* — Maria Laios
*Assistant Examiner* — Bartholomew A Hornsby
(74) *Attorney, Agent, or Firm* — Lewis Roca Rothgerber Christie LLP

(57) ABSTRACT

The present invention relates to a housing for a battery. In the case of coolant leakage, the housing includes an absorbent layer disposed on a bottom portion and an insulating film covering a portion of the absorbent layer in order to improve operational safety.

12 Claims, 7 Drawing Sheets

(51) Int. Cl.
   *H01M 10/625* (2014.01)
   *H01M 10/6557* (2014.01)
   *H01M 10/6567* (2014.01)
   *H01M 10/42* (2006.01)
   *H01M 10/48* (2006.01)
   *H01M 50/24* (2021.01)

(52) U.S. Cl.
   CPC ....... *H01M 10/613* (2015.04); *H01M 10/625* (2015.04); *H01M 10/6557* (2015.04); *H01M 10/6567* (2015.04); *H01M 50/24* (2021.01); *H01M 2220/20* (2013.01)

(56) References Cited

U.S. PATENT DOCUMENTS

| | | | |
|---|---|---|---|
| 7,445,868 B2 | 11/2008 | Ikeda et al. | |
| 8,492,016 B2 | 7/2013 | Shin et al. | |
| 9,614,196 B2 | 4/2017 | Lee et al. | |
| 2009/0220851 A1* | 9/2009 | Nakazawa | H01M 2/1094 429/58 |
| 2010/0009224 A1 | 1/2010 | Ku et al. | |
| 2013/0004822 A1* | 1/2013 | Hashimoto | H01M 10/6556 429/120 |
| 2014/0220405 A1 | 8/2014 | Damon et al. | |
| 2014/0315064 A1 | 10/2014 | Katayama et al. | |

FOREIGN PATENT DOCUMENTS

| | | |
|---|---|---|
| JP | 4706823 B2 | 6/2011 |
| JP | 2014-192044 A | 10/2014 |
| JP | 2014-216248 A | 11/2014 |
| KR | 10-2010-0005865 A | 1/2010 |
| KR | 10-1029838 B1 | 4/2011 |
| KR | 10-2012-0045815 A | 5/2012 |
| KR | 10-1488411 B1 | 2/2015 |
| KR | 10-1679921 B1 | 11/2016 |
| WO | WO 2009/020805 A1 | 2/2009 |
| WO | WO 2012/076808 A1 | 6/2012 |

OTHER PUBLICATIONS

Extended European Search Report issued in European Patent Application No. 17153287.2, dated Mar. 3, 2017, 8pp.
SIPO Office Action; Application Serial No. 201880007690.X, dated Jul. 5, 2021, 14 pages.

* cited by examiner

BATTERY HOUSING COMPRISING ABSORBENT LAYER AND INSULATION FILM

CROSS-REFERENCE TO RELATED APPLICATIONS

This application is a National Phase Patent Application of International Patent Application Number PCT/KR2018/000675, filed on Jan. 15, 2018, which claims priority of European Patent Application No. 17153287.2, filed Jan. 26, 2017 and Korean Patent Application No. 10-2018-0002985, filed Jan. 9, 2018. The entire contents of all of which are incorporated herein by reference.

TECHNICAL FIELD

The present invention relates to a battery housing with a bottom portion, for accommodating a battery cell, and at least a part of a cooling device for cooling the battery cell. More particularly, the present invention relates to a battery module having the battery housing and a vehicle including the battery module.

BACKGROUND ART

A rechargeable battery differs from a primary battery, which only performs non-reversible conversion from chemical energy into electrical energy, in that it can repeatedly perform charging and discharging. A low-capacity rechargeable battery is used as a power source for small electronic devices such as portable telephones, laptops computers, and camcorders, and a high-capacity rechargeable battery is used as a power source for vehicles.

In general, the rechargeable battery may include an electrode assembly including a positive electrode, a negative electrode, and a separator interposed between the positive electrode and the negative electrode, a case for accommodating the electrode assembly therein, and an electrode terminal electrically connected to the electrode assembly. An electrolyte solution is injected into the case to enable charging and discharging of the battery through an electrochemical reaction of the positive electrode, the negative electrode, and the electrolyte solution. The case may be cylindrical or rectangular depending on the purpose and use of the case.

The rechargeable battery may be used as a battery module formed of a plurality of unit cells connected in series and/or in parallel so as to drive a motor of a hybrid vehicle that requires high energy density. That is, the battery module is formed by connecting electrode terminals of a plurality of unit battery cells to each other in order to realize a rechargeable battery conforming to a required amount of electrical power and having high power for driving, e.g., an electric vehicle.

The battery module may be designed in either a block or modular manner. In the block design, each of the unit battery cells is coupled to a common power collecting structure and a common battery management system, and is disposed within the housing. In the modular design, a plurality of unit battery cells are connected to each other to form a submodule, and a plurality of submodules are connected to each other to form a battery module. A battery management function may be implemented at least partially in a module or submodule level, thereby improving compatibility. To form a battery system, one or more battery modules may be equipped with a thermal management system to be mechanically and electrically integrated, so as to be in communication with one or more electrical consumption devices.

For thermal control of the battery system, the thermal management system is required to enable at least one battery module to be safely used by efficiently releasing, discharging, and/or dissipating heat generated from the rechargeable battery of the battery module. When the heat generated in the battery is not sufficiently released, discharged, and/or dissipated, a temperature deviation occurs between battery cells, so that one or more battery modules may not generate a desired amount of electrical power. In addition, when an internal temperature of the rechargeable battery rises, it may lead to an abnormal internal reaction, thereby degrading the charge/discharge performance of the rechargeable battery and shortening the cycle-life of the rechargeable battery. Therefore, a cooling device for efficiently releasing, discharging, and/or dissipating heat generated in the cells is required. A cooling device usually uses a mixture of water and glycol as a coolant. When leakage occurs in the cooling device, the coolant may flow out of the cooling device and may flow into the battery housing. As a result, there is a risk that conductive portions of battery components to which the voltage is applied are short-circuited by the coolant. Particularly, in the case of a battery of a voltage of 400 V, the conductive portions of the battery may be short-circuited due to hydrolysis of the coolant in which a conductive salt is generated.

DISCLOSURE

Technical Problem

The present invention has been made in an effort to provide a battery housing that can overcome or reduce at least some of drawbacks of the conventional art and can ensure operational safety of a battery system in case of leakage.

Technical Solution

According to the present invention, one or more drawbacks of a conventional art can be overcome or reduced. Particularly, the battery housing includes an absorbent layer disposed on the bottom portion inside the battery housing and an insulating film disposed on the absorbent layer, and the insulating film is partially fixed to the absorbent layer, while a region between two fixed sections between the insulating film and the absorbent layer provides a fluid passage. In addition, the battery housing of the aforementioned rechargeable battery is the battery housing according to the present invention. According to another aspect of the present invention, the rechargeable battery of the aforementioned vehicle is the rechargeable battery according to the present invention.

Additional aspects of the present invention will become apparent from the dependent claims, drawings, and/or detailed description, which are set forth below to illustrate the various exemplary embodiments. These various exemplary embodiments may be combined in various configurations.

According to a first exemplary embodiment of the present invention, the insulating film may include a groove opened toward the absorbent layer. The groove forms a passage or channel through which a coolant may flow. As the groove has an open structure toward the absorbent layer, the coolant is effectively transferred to the entire absorbent layer and distributed over the absorbent layer, so that the coolant may be supplied throughout the absorbent layer. As a result, the coolant is effectively transferred away from the conductive portion of the battery.

At least a portion of the cooling device (e.g., a cooling pipe) may extend through the battery housing. Alternatively or additionally, a heat exchange member of the cooling device may be disposed in the battery housing, and a coolant path may extend through the heat exchange member.

Particularly, during operation of the rechargeable battery, the bottom portion may be provided as a bottom plate or the like on a lowermost surface, which is an inner bottom surface of the battery housing. The absorbent layer may be provided on the bottom portion along a gravity direction, and the insulating film may be provided on the absorbent layer. The absorbent layer may be in direct contact with the bottom portion, and the insulating film may be in direct contact with the absorbent layer. The bottom portion may be disposed to face an opening of the battery housing, which can be sealed by a cap.

Accordingly, the groove may be directed downward.

A cross-section of the insulating film perpendicular to a longitudinal direction of the groove has a zigzag shape. The groove with the zigzag-shaped cross-section may be easily formed at low cost, e.g., by folding or heating and molding the insulating film. Also, the zigzag-shaped cross-section may further provide an open groove away from the absorbent layer. Since such grooves face upward, the coolant leaking from the cooling device may be easily received, and the coolant may be guided to the absorbent layer to be away from the conductive portion. For example, the conductive portion may be a terminal and/or a housing of the battery cell.

The insulating film may be a member or a foil made of a thermoplastic material. The insulating film may be formed in advance before being mounted to the bottom portion and the absorbent layer. Alternatively or additionally, the insulating film may be formed on the absorbent layer by a deep-drawing technique. The formation of the insulating film may reduce the cost and installation space required for the insulating film, and may further separate the absorbent layer from the conductive portion of the battery with excellent adaptability.

The battery housing may include a reinforcement member disposed on the bottom portion to improve mechanical stability of the battery housing. When the battery having the battery housing is used, the reinforcement member may protrude from the bottom portion in an opposite direction to that of gravity. The reinforcement member may be a reinforcement rib that extends along a longitudinal direction thereof. A conductive portion of the battery, e.g., a housing of the battery cells, may be disposed on the reinforcement member. Accordingly, the reinforcement member may maintain the battery cells at a certain distance from the absorbent layer, and the insulating film is further separated therefrom to electrically insulate the absorbent layer from the battery cells.

The reinforcement member may be formed to have a continuous opening. The reinforcement member may be at least partially formed along the longitudinal direction thereof, and the continuous opening may extend perpendicularly to the longitudinal direction of the reinforcement member. The coolant may flow over the reinforcement member through the continuous opening so as to easily flow from one side of the reinforcement member to the other side of the reinforcement member without increasing the risk of contact when approaching the conductive portion of the battery. Thus, the continuous opening further reduces the risk of the coolant contacting the conductive portion of the battery.

The continuous opening may communicate with the at least one groove so that the coolant can easily flow between the at least one groove and the continuous opening in both directions so as to better distribute the leaked coolant.

The insulating film may cover the reinforcement member without blocking the continuous opening, and thus the continuously flowing flow passage extends to at least one of the grooves and the continuous opening so that the leaked coolant easily flows from one side of the reinforcement member to the other side thereof, thereby efficiently dispersing the coolant.

A clear space may be formed between the continuous opening and the absorbent layer. As a result, the leaked coolant can easily flow from the continuous opening to the absorbent layer in both directions.

The battery housing may include at least two of the reinforcement members, and the absorbent layer is disposed between the two reinforcement members. For example, when the battery having the battery housing is used, two reinforcement members may protrude from a lower portion thereof in an opposite direction to that of gravity. For example, each reinforcement member may be a reinforcement rib that is linearly formed along a longitudinal direction thereof. The reinforcement members may extend parallel to each other or at angles of 0 to 90 degrees. Thus, the bottom portion may include a storage unit or depression that is formed for receiving the coolant leaking through the reinforcement member. This storage or depression may cause the leaked coolant to accumulate due to gravity, and may be easily absorbed.

The battery housing may include at least two insulating films, a first one of the insulating films covers a first one of the reinforcement members, a second insulating film covers a second one of the reinforcement members, and the section is exposed by the insulating films. In particular, the battery housing may include a plurality of insulating films and a plurality of absorbent layers, each of the insulating films covering the area of the separated absorbent layer. For example, the insulating films may be disposed to be separated from each other, and each of the insulating films covers one of reinforcement members. The exposed region may be disposed between the reinforcement members, and may be disposed at a certain distance from the reinforcement members. As a result, the leaking coolant is guided from the reinforcement member and a portion of the battery that can contact the reinforcement member toward the absorbent layer to be distributed and absorbed. Alternatively, the insulating film may be formed as a single member having the continuous opening such that the coolant flows into the absorbent layer through the continuous opening.

The bottom may have a wave-like non-uniform shape, and cavities may be provided between the absorbent layer and the bottom portion. The bottom portion may contact the absorbent layer between the cavities. When the absorbent layer for absorbing the coolant reaches a maximum capacity, excess coolant may be contained in the cavity. Additionally or alternatively, extra coolant may be supplied between the absorbent layer and the insulator film, such as that contained in a storage unit or depression disposed between the grooves which face the absorbent layer and/or the unfilled reinforcement members. Additionally or alternatively, an upper space of the absorbent layer and an upper space of the insulating film may be used to absorb the coolant when the absorbent layer expands.

A clear space may be formed between a sidewall of the battery housing and the absorbent layer at an edge of the bottom portion. The clear space may be covered with the insulating film. A side surface thereof may protrude from the bottom portion. The clear space may form a continuous or discontinuous channel adjacent to the at least one absorbent layer or the plurality of absorbent layers. The insulating film may at least partially or completely cover the clear space of the side surface.

The absorbent layer may be formed of a super-absorbent polymer that absorbs the coolant. An exemplary material of the super-absorbent resin may be a poly-arcylic acid sodium salt. Other exemplary materials are a polyacrylamide copolymer, an ethylene maleic anhydride copolymer, cross-linked carboxymethyl cellulose, polyvinyl alcohol copolymers, a cross-linked polyethylene oxide, and a starch grafted copolymer of polyacrylonitrile. The insulating film may be formed of an electrical insulator capable of insulating a voltage of 400 V or more generated inside of the battery.

The battery housing may be a housing of a battery module that may include one or more of the battery cells, or a housing of a battery system that may include one or more of the battery modules. When the battery housing is a housing of the battery system, a housing of the battery modules may be the housing according to the present invention.

The present invention will now be described with reference to exemplary embodiments and drawings. The various features of the exemplary embodiments may be combined in various ways as described above.

Advantageous Effects

According to the present invention, it is possible to secure operational safety of a battery system even in case of leakage.

DESCRIPTION OF THE DRAWINGS

The features of the present invention will become apparent to those skilled in the art from the following detailed description of various embodiments with reference to the drawings.

MODE FOR INVENTION

The present invention will be described more fully hereinafter with reference to the accompanying drawings, in which exemplary embodiments of the invention are shown. The above and other objects, features, and advantages of the present invention will be more apparent from the following detailed description taken in conjunction with the accompanying drawings. To clearly describe the present invention, parts that are irrelevant to the description are omitted, and like numerals refer to like or similar constituent elements throughout the specification. As used in this specification, the term "and/or" includes any and all combinations of one or more related listed items. The use of "can/may" in describing an exemplary embodiment of the present invention refers to "at least one exemplary embodiment of the present invention." Although this specification describes various exemplary embodiments, it will be apparent for those skilled in the art to practice the invention by modifying the invention. All such modifications are deemed to be within the scope of the claims.

It may be understood by those of ordinary skill in the art that a film, region, or element is referred to as being "on" another film, region, or element other than that directly on another film, region, or element.

Figure 1:
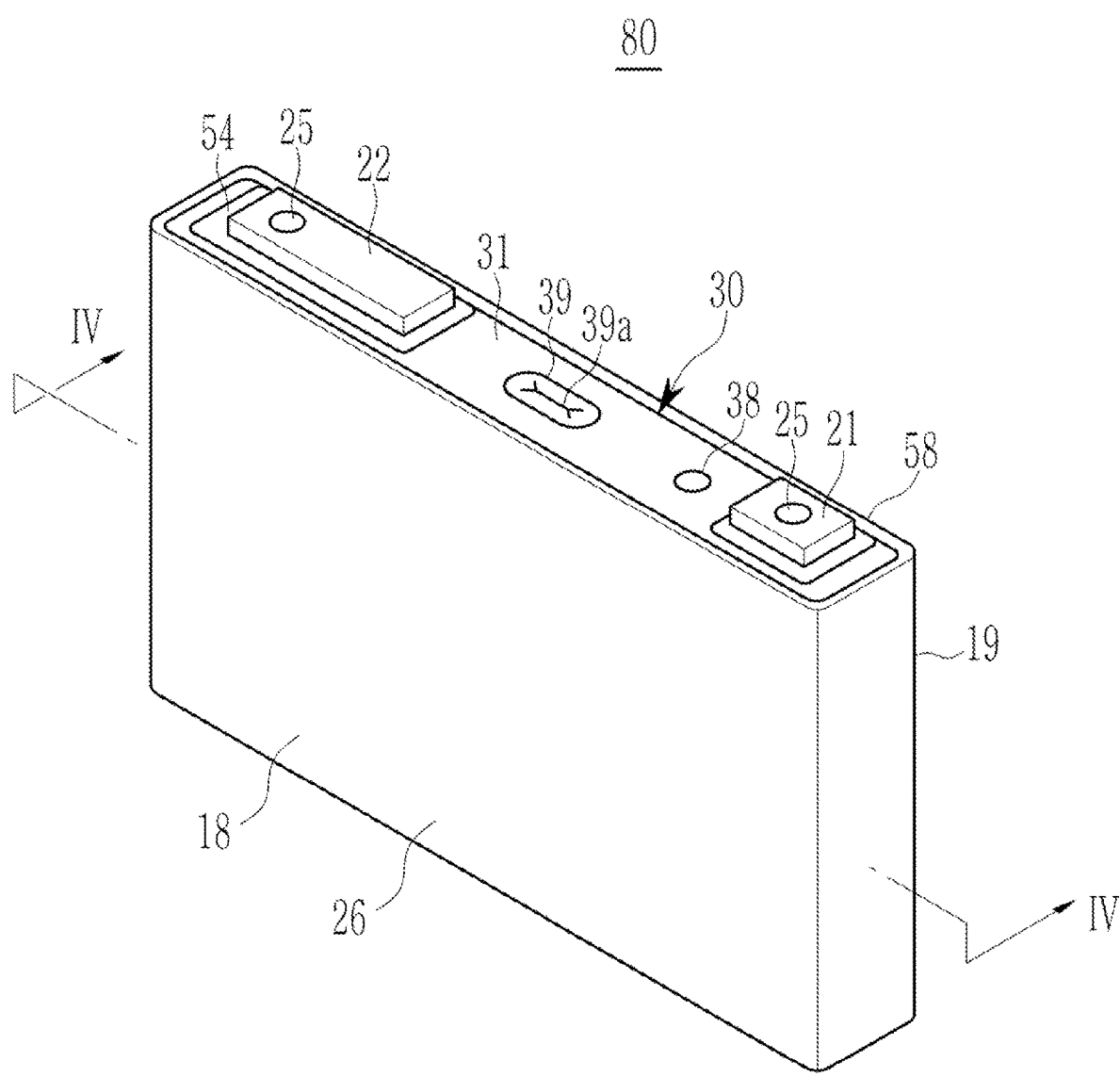
FIG. 1 illustrates a perspective view of a battery cell according to an exemplary embodiment.
Figure 2:
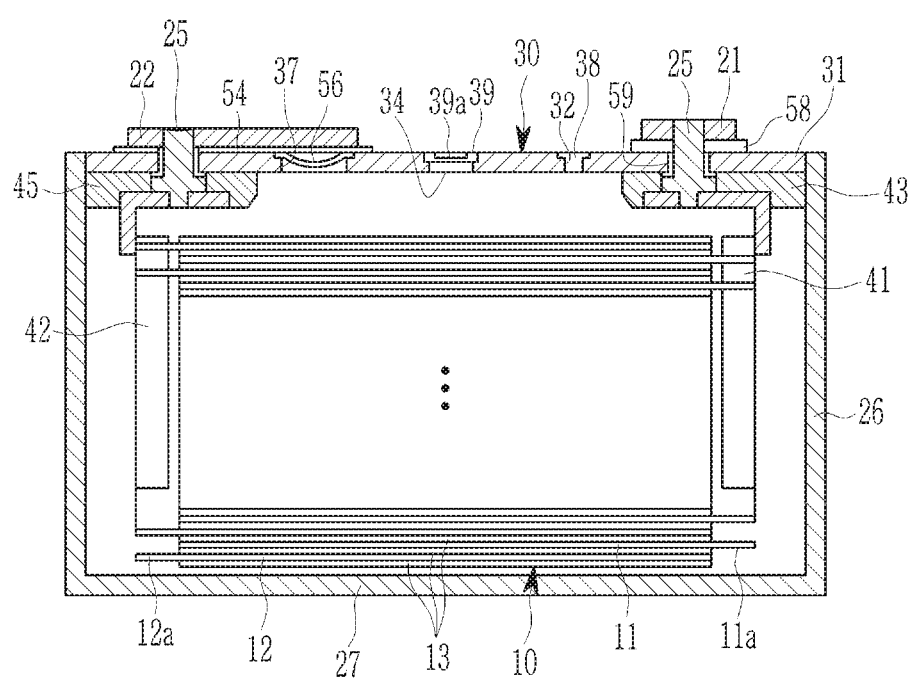
FIG. 2 illustrates a cross-sectional view of a battery cell according to an exemplary embodiment.

FIG. 1 illustrates a perspective view of a battery cell according to an exemplary embodiment, and FIG. 2 illustrates a cross-sectional view taken along a line IV-IV of FIG. 1.

Referring to FIG. 1 and FIG. 2, according to the present exemplary embodiment, a battery cell 80 includes an electrode assembly 10, and a case 26 for accommodating the electrode assembly 10 and an electrolyte solution. The battery cell 80 may further include a cap assembly 30 for sealing an opening of the case 26. The battery cell 80 is exemplified as a prismatic lithium ion rechargeable battery, but the present invention is not limited thereto.

The electrode assembly 10 may be formed as a jelly-roll type of electrode assembly in which a positive electrode 11 and a negative electrode 12 are spirally wound with a separator 13 interposed therebetween. Each of the positive electrode 11 and the negative electrode 12 may include coated regions of current collectors made of a thin gold foil on which an active material is coated, and a positive electrode uncoated portion 11a and a negative electrode uncoated portion 12a at which no active material is coated on the current collector. A coated region of the positive electrode 11 may be made, e.g., by coating an active material such as a transition metal oxide on a substrate made of a metal foil such as aluminum. A coated region of the negative electrode 12 may be made by coating an active material such as carbon or graphite on a substrate made of a metal foil such as copper or nickel.

The positive electrode uncoated region 11a may be disposed at one end of a longitudinal direction of the positive electrode 11, and the negative electrode uncoated region 12a may be disposed at one end of a longitudinal direction of the negative electrode 12. The positive electrode uncoated region 11a and the negative electrode uncoated region 12a may be disposed at opposite sides of each of the coated regions. The separator 13 may include a plurality of separators which can be spirally wound after the positive electrode 11, the negative electrode 12, and the separator 13 are alternately disposed. The electrode assembly 10 has a structure including a plurality of sheets in which the positive electrode 11, the separator 13, and the negative electrode 12 are repeatedly stacked, but the present invention is not limited thereto.

The electrode assembly 10 may be accommodated in the case 26 together with an electrolyte solution. The electrolyte solution may be prepared by using a lithium salt such as LiPF6 or LiBF4, and an organic solvent such as EC, PC, DEC, EMC, or EMC. The electrolyte solution may be in a liquid, solid, or gel state. The case 26 may be made to have a substantially rectangular parallelepiped shape, and an opening may be positioned one surface thereof. The case 26 may be made of a metal such as aluminum as an example.

The case 26 includes a substantially rectangular bottom surface 27 to form a space for accommodating the electrode assembly 10 therein, and a pair of wide side surfaces 18 and 19 as first sidewalls and a pair of narrow side surfaces as second sidewalls that are vertically connected to an end portion of the bottom surface 27. The first sidewalls 18 and 19 may be disposed to face each other, and the second sidewalls may be disposed to face each other to be connected to the first sidewalls 18 and 19. A length of an edge where the bottom surface 27 and the first sidewalls 18 and 19 are connected to each other may be longer than that of an edge where the bottom surface 27 and the second sidewalls are connected to each other. Preferably, a first sidewall and a second sidewall which are adjacent to each other are connected at an angle of about 90 degrees.

The cap assembly 30 includes a cap plate 31 bonded to the case 26 to cover an opening of the case 26, and a positive terminal 21 (first terminal) and a negative terminal 22 (second terminal) protruded outward from the cap plate 31 to be electrically connected to the positive electrode 11 and the negative electrode 12, respectively. The cap plate 31 may have a plate shape extending in one direction to be coupled to the opening of the case 26. The cap plate 31 may include an inlet 32 and a vent hole 34 communicating with the interior of the cap assembly 30. The inlet 32 may be configured to inject an electrolyte solution, and a sealing cap 38 may be mounted on or in the inlet 32. Also, a vent member 39 including a notch 39a, which may be opened due to a predetermined pressure, may be mounted to or in the vent hole 34. Herein, the predetermined pressure may be an excess pressure having a predetermined pressure value. For example, the vent member 39 may be an overpressure valve configured to open at a predetermined pressure. Alternatively, the vent member 39 may be, e.g., a sealing member configured such that the notch 39a is broken at a predetermined pressure.

The positive terminal 21 and the negative terminal 22 may be mounted so as to protrude above the cap plate 31. The positive terminal 21 may be electrically connected to the positive electrode 11 through a current collecting tab 41, and the negative terminal 22 may be electrically connected to the negative electrode 12 through a current collecting tab 42. A terminal connection member 25 may be mounted between the positive terminal 21 and the current collecting tab 41 to electrically connect the positive terminal 21 and the current collecting tab 41. The terminal connection member 25 may be inserted into a hole formed in the positive terminal 21 such that a lower portion thereof may be welded to the current collecting tab 41.

A gasket 59 may be mounted between the terminal connection member 25 and the cap plate 31 for sealing. Further, the gasket 59 may be inserted into a hole through which the terminal connection member 25 extends. In addition, a lower insulating member 43 into which a lower portion of the terminal connection member 25 may be inserted may be mounted on a lower portion of the cap plate 31. A connection plate 58 for electrically connecting the positive terminal 21 and the cap plate 31 may be mounted between the positive terminal 21 and the cap plate 31. The terminal connection member 25 may be inserted into the connection plate 58. Accordingly, the cap plate 31 and the case 26 may be positively charged.

A terminal connection member 25 may be mounted between the positive negative terminal 22 and the current collecting tab 42 to electrically connect the positive negative terminal 22 and the current collecting tab 42. The terminal connection member 25 may be inserted into a hole formed in the negative terminal 22, such that upper and lower portions of the terminal connection member 25 can be welded to the negative terminal 22 and the current collecting tab 42, respectively. A sealing gasket similar to the gasket 59 is inserted into the hole through which the terminal connection member 25 extends to be mounted between the negative terminal 22 and the cap plate 31. In addition, a lower insulation member 45 may be mounted at a lower portion the cap plate 31 to insulate the negative terminal 22 and the current collecting tab 42 from the cap plate 31.

An upper insulation member 54 may be mounted between the negative terminal 22 and the cap plate 31 for electrical insulation therebetween. The terminal connection member 25 may be inserted into a hole formed in the upper insulation member 54. The cap assembly 30 may include a short-circuit hole 37 and a short-circuit member 56 installed in the short-circuit hole 37 to short circuit the positive electrode 11 and the negative electrode 12. The short-circuit member 56 may be disposed between the upper insulation member 54 and the cap plate 31, and the upper insulating member 54 may have a cutout formed at a position corresponding to the short-circuit member 56. The short-circuit member 56 may overlap the negative terminal 22 exposed through the cutout, and they may be disposed separately.

The short-circuit member 56 may be disposed between the negative terminal 22 and the vent hole 34, or may be disposed closer to the negative terminal 22 than the vent hole 34. The short-circuit member 56 may include a convex curved portion curved toward the electrode assembly 10, and an edge portion formed outside the curved portion and fixed to the cap plate 31. When an internal pressure of the battery cell 80 rises, the short-circuit member 56 may be deformed to be short-circuited. That is, when a gas is generated due to an unwanted reaction in the battery cell 80, the internal pressure of the cell 80 may rise. When the internal pressure of the battery cell 80 rises above a predetermined level, the curved portion of the short-circuit member 56 is concavely deformed in an opposite direction, causing a short circuit while contacting the negative terminal 22.

Figure 3:
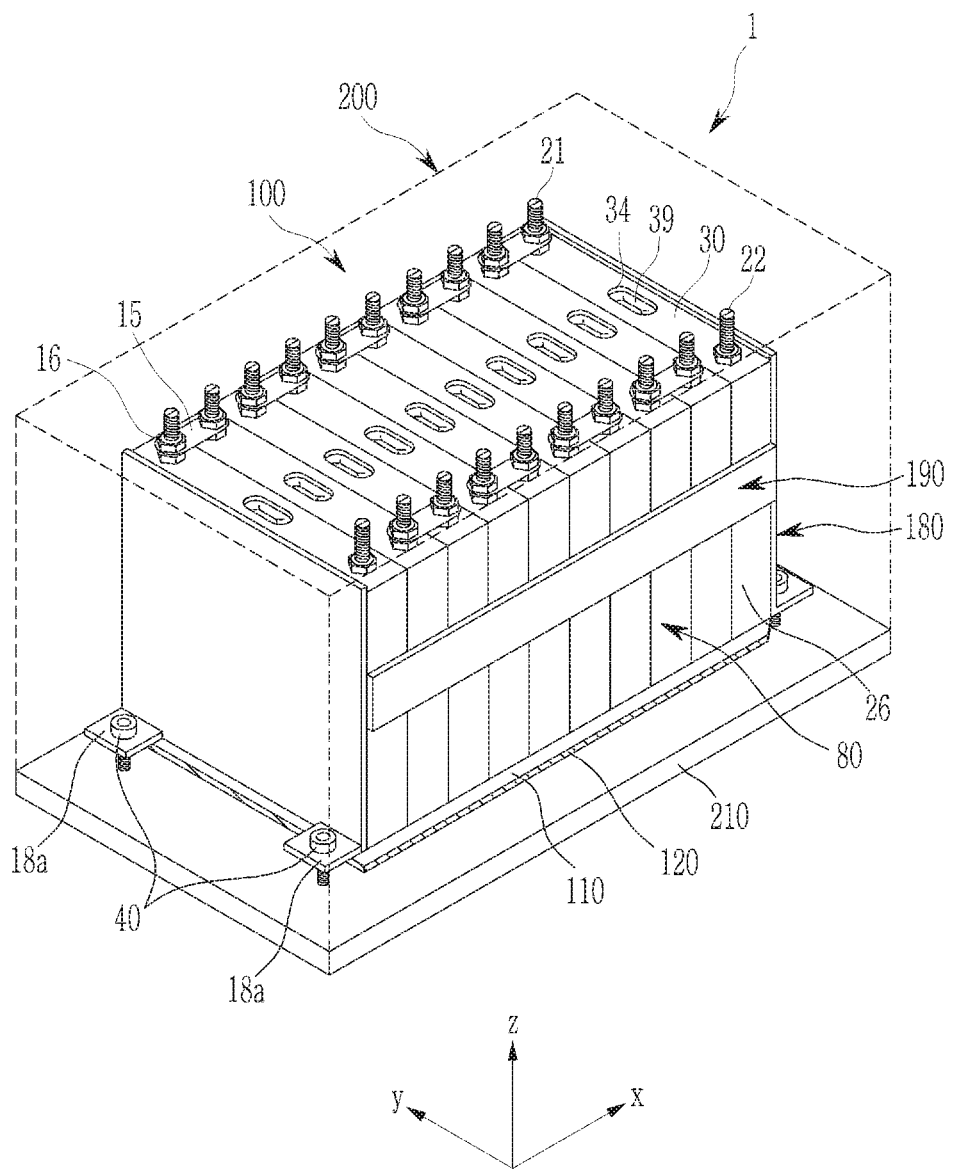
FIG. 3 illustrates a perspective view of a battery module according to an exemplary embodiment.

Referring to FIG. 3, according to an exemplary embodiment, a battery module 100 includes a plurality of battery cells 80 arranged in one direction, and a heat exchange member 110 disposed adjacent to bottom surfaces of the battery cells 80. A pair of end plates 180 are provided outside the battery cell 80 to face wide surfaces of the battery cells 80, and a connection plate 190 is configured to be connected to the pair of end plates 180 to fix the battery cells 80 together with the end plates 180. Fastening portions 18a positioned on opposite sides of the battery module 100 are fixed to a bottom plate 210 by bolts 40. The bottom plate 210 is a portion of a battery housing 200.

Herein, each of the battery cells 80 is a prismatic (or rectangular) cell, and the battery module 100 is made by stacking the cells on top of wide surfaces thereof together. In addition, each battery cell 80 includes a battery case 26 configured to accommodate an electrode assembly and an electrolyte therein. The battery case 26 is closed and sealed by a cap assembly 30. The cap assembly 30 includes a positive terminal 21 and a negative terminal 22 having different polarities, and a vent hole 34. The vent hole 34, which is a safety means of each of the battery cells 80, serves as a passage for discharging a gas generated in the battery cells 80 to the outside. A vent member 39 is installed in the vent hole 34. The positive terminal 21 and the negative terminal 22 of battery cells 80 adjacent to each other may be electrically connected through a bus bar 15, and the bus bar 15 may be fixed by a fastening means such as a nut 16 or the like. Therefore, the battery module 100 may be used as a power source device by electrically connecting the battery cells 80 in a bundle.

Generally, the battery cells 80 generate a large amount of heat during charging/discharging. The generated heat accumulates in the battery cells 80, accelerating deterioration of the battery cells 80. Accordingly, the battery module 100 further includes a heat exchange member 110 disposed adjacent to the bottom surfaces of the battery cells 80 to cool the battery cells 80. An elastic member 120 made of an elastic material such as rubber may be interposed between the bottom plate 210 and the heat exchange member 110.

The heat exchange member 110 may include a cooling plate having a size corresponding to the bottom surfaces of the battery cells 80, e.g., a size that completely overlaps the entire bottom surfaces of the battery cells 80. The cooling plate usually includes a passage through which a cooling fluid can pass. The cooling fluid performs heat exchange with the battery cells 80 while circulating through an interior of the heat exchange member 110, e.g., an interior of the cooling plate.

Hereinafter, a surface of the bottom plate 210 which faces the battery cells 80 is defined as a bottom portion 220 of the battery housing 200. The battery housing 200 including the battery cells 80 forms a battery 1, particularly a rechargeable battery 1.

The vent hole 34 and/or the vent member 39 may be aligned continuously or along a direction in which the battery cells 80 are aligned with each other.

Figure 4:
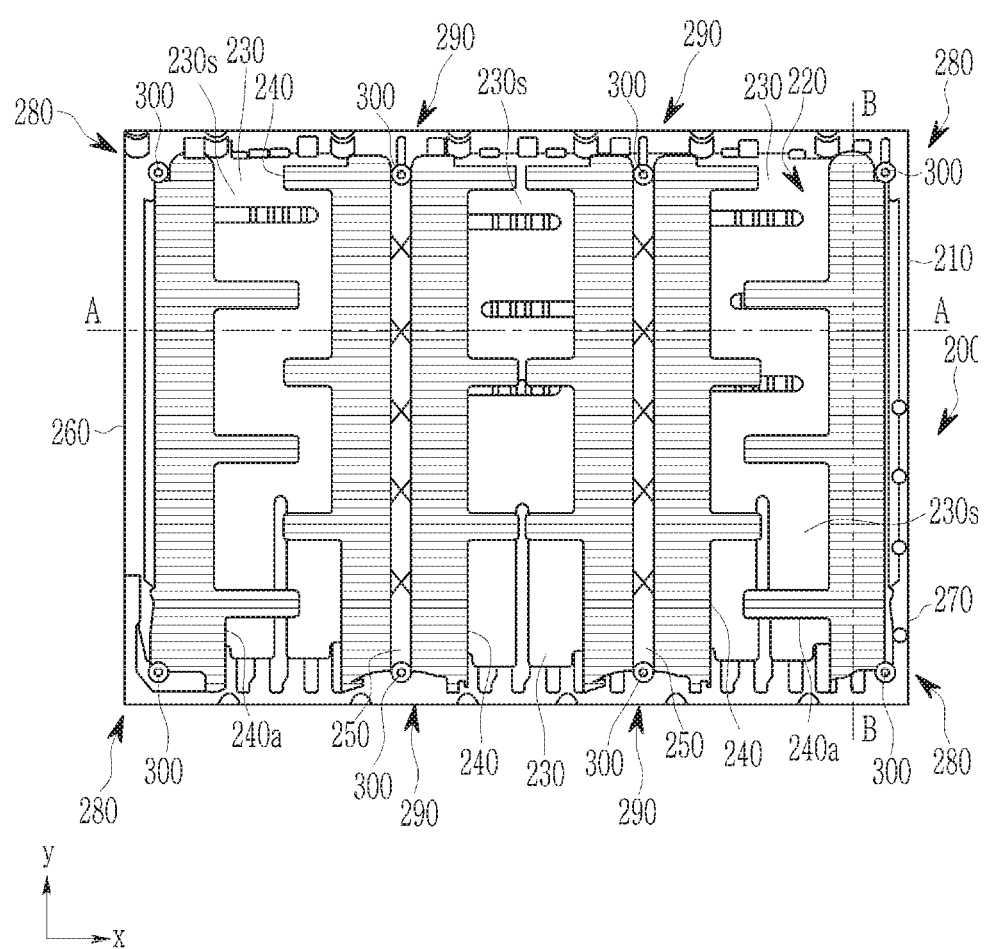
FIG. 4 illustrates a schematic top plan view of a bottom portion for a battery housing according to an exemplary embodiment.

FIG. 4 illustrates a top plan view of the bottom plate, i.e., the bottom portion 220 of the bottom plate 210 with respect to the battery housing 200, according to an exemplary embodiment of the present invention. When a battery having the battery housing 200 is used, the plan view is a plan view along a gravity direction.

At least one absorbent layer 230 is disposed on the bottom portion 220. In the exemplary embodiment illustrated in FIG. 4, three absorbent layers 230 are disposed on the bottom portion 220. The at least one absorbent layer 230 may include or may be made of a super-absorbent polymer.

In addition, at least one insulating film 240 is disposed on the at least one of the absorbent layers 230. Accordingly, the at least one absorbent layer 230 is at least partially disposed between the bottom portion 220 and the at least one insulating film 240.

The insulating film 240 is partially (sectionally) fixed to the absorbent layer 230. For example, the absorbent layer 230 and the insulating film 240 may be fixed to each other by an adhesive or by welding. When the absorbent layer 230 and the insulating film 240 are fixed to each other by welding, a process such as ultrasonic welding may be used. Fixed points, e.g., welded points, are spaced apart from each other to provide a region which is formed between two fixed sections or spots, between the insulating film 240 and the absorbent layer 230 as a fluid passage. Thus, a cooling fluid may easily flow between the absorbent layer 230 and the insulating film 240 to be absorbed into not only sections of the absorbent layer 230 covered by the insulating film 240 but also other sections of the absorbent layer 230 that are not covered by the insulating film 240.

The battery housing 200 may include at least one, e.g., two or more, reinforcement members 250 disposed on the bottom portion 220 of the battery housing 200. The at least one or more reinforcement members 250 may protrude from the bottom portion 220, or may extend away from the bottom portion 220 in a direction that is perpendicular to the bottom portion 220. In the exemplary embodiment illustrated in FIG. 4, two insulating films 240 cover each of the different reinforcement members 250 one by one. In particular, the insulating films 240 may be formed on the reinforcement members 250 and the absorbent layers 230 by a deep-drawing method. One of the absorbent layers 230 may be disposed between the reinforcement members 250. In the exemplary embodiment illustrated in FIG. 4, two of the three absorbent layers 230 are disposed between one of the reinforcement members 250 and each side surface 260 and 270 of the battery housing 200. Herein, the side surfaces 260 and 270 may extend parallel to each other, and may extend parallel to the reinforcement members 250. Accordingly, a longitudinal direction of the reinforcement members 250 may be a direction extending parallel to the side surfaces 260 and 270. That is, the reinforcement members 250 may extend parallel to each other.

The insulating films 240 covering the reinforcement members 250 may not cover only the absorbent layers 230 disposed between the reinforcement members 250. The insulating films 240 may at least partially cover the absorbent layer 230 disposed on the other side of each reinforcement member 250.

In addition, the battery housing 200 may include at least one additional insulating film 240a. The at least one additional insulating film 240a covers one absorbent layer 230 disposed adjacent to one of the side surfaces 260 and 270. The additional insulating film 240a may further cover at least a portion of each of the side surfaces 260 and 270.

At least one section 230 of each of the absorbent layers 230 is not covered by any of the insulating films 240 and 240a, and this section is hereinafter referred to as an exposed section 230s.

A positioning member 300 for disposing and/or fixing at least one battery cell or at least one battery module is provided at at least a portion of a corner 280 of the bottom portion 220 and/or a selected portion or all end portions 290 of the reinforcement members 250. In the exemplary embodiment illustrated in FIG. 4, the positioning member 300 is not covered by any part of the absorbent layers 230 or the insulating films 240.

Figure 5:
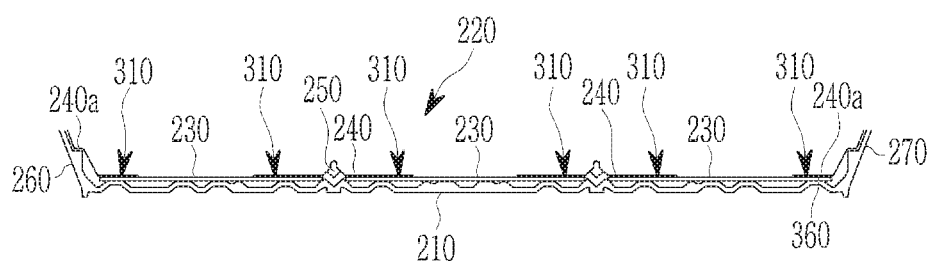
FIG. 5 illustrates a schematic cross-sectional view of a bottom portion for a battery housing according to an exemplary embodiment.

FIG. 5 illustrates a cross-sectional view taken along a line A-A of FIG. 4.

In FIG. 5, points indicated by leader lines represent fixed points 310 (e.g., welded points) at which the insulating films 240 and/or the additional insulating films 240a are fixed to respective portions of the absorbent layers 230. Referring to FIG. 5, the fixed points 310 are spaced apart from each other along one direction of the battery housing 200. A fixing joint for fixing one insulating film 240 to one absorbent layer includes the fixed points 310. The fixed points 310 are spaced apart from each other to form regions where the insulating films 240 and 240a and the absorbent layers 230 are not fixed between the fixed points 310. These regions provide fluid passages between the insulating films 240 and 240a and the absorbent layers 230.

Figure 6:
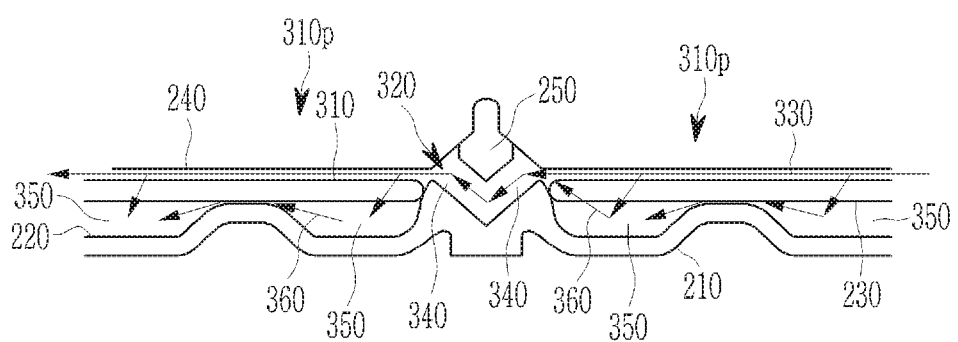
FIG. 6 illustrates a schematic enlarged cross-sectional view of a bottom portion for a battery housing according to an exemplary embodiment.

FIG. 6 is an enlarged view of FIG. 5, illustrating one region for a fluid passage.

As illustrated in FIG. 6, the at least one reinforcement member 250 may be formed to have a continuous opening 320 that can extend perpendicularly in a longitudinal direction y of the reinforcement member 250. The continuous opening 320 formed along the longitudinal direction of the reinforcement member 250 may be closed at opposite ends thereof. The continuous opening 320 connects two section of the bottom plates 210 disposed on opposite side surfaces of at least one or more reinforcement members 250 so as to allow a cooling fluid to flow from one section to another section in a direction that is perpendicular to the longitudinal direction of the at least one or more reinforcement members 250.

In addition, a region for forming a fluid passage 310p between the fixed points 310 remains such that a cooling fluid flows along a flow path 330 formed between the absorbent layer 230 and the insulating film 240 by a distance between the fixed points 310. The flow path 330 may extend through the continuous opening 320.

Each absorbent layer 230 may be disposed at a distance from the continuous opening 320 so that a clear space 340 that is not interfered with by any portion of the absorbent layer 230 is provided between the continuous opening 320 and each of the absorbent layers 230.

The bottom portion 220 or the bottom plate 210 has a wave shape with a protrusion. Accordingly, a cavity 350 is formed between the at least one absorbent layer 230 and the bottom portion 220. The cooling fluid that is not absorbed by the absorbent layer 230 may be stored in the cavity 350. Optionally or additionally, a bypass 360 of the flow path 330 may extend through the cavity 350. The flow path 330 and the bypass 360 may be combined at least in the continuous opening 320.

Figure 7:
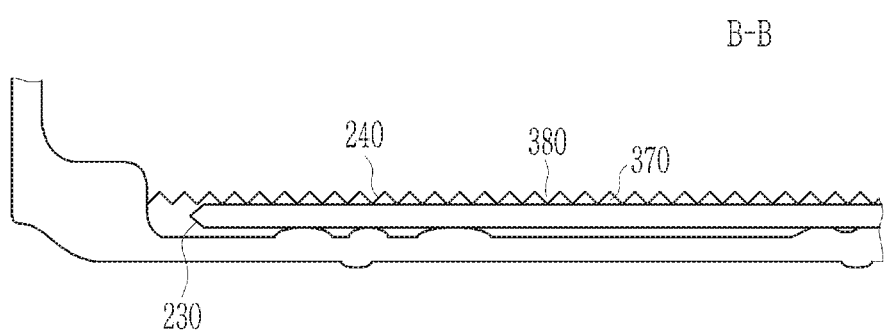
FIG. 7 illustrates a schematic cross-sectional view of a bottom portion for a battery housing according to an exemplary embodiment.

FIG. 7 illustrates a cross-sectional view taken along a line B-B of FIG. 4. FIG. 7 illustrates the insulating film 240, wherein at least one additional insulating film 240a may have a similar shape.

The insulating film 240 may include grooves 370 that are opened toward the absorbent layer 230. The grooves 370 may extend perpendicularly with respect to at least one reinforcement member. At least one or preferably all of the grooves 370 may be connected to at least one continuous opening of the at least one reinforcement member in a fluid-conductive manner such that a coolant flowing between the insulating film 240 and the absorbent layer 230 may easily flow toward the continuous opening or may be distributed between the insulating film 240 and the absorbent layer 230.

A cross-section of the insulating film 240 perpendicular to a direction that is parallel to a longitudinal direction y of the groove 370, that is, a longitudinal direction y of the at least one reinforcement member 250, may have a zigzag shape. Thus, the insulating film 240 provides not only the groove 370 opened towards the absorbent layer 230, but also a groove 380 which is opened in a direction away from the absorbent layer 230, e.g., toward battery cells of a battery. The groove 380, which is open in the direction away from the absorbent layer 230, may direct the cooling fluid to an exposed region of the absorbent layer 230.

<Description of Symbols>

| | |
|---|---|
| 80: | battery cell |
| 100: | battery module |
| 200: | battery housing |
| 210: | bottom plate |
| 220: | bottom portion |
| 230: | absorbent layer |
| 240: | insulating film |
| 250: | reinforcement member |

-continued

<Description of Symbols>

| | |
|---|---|
| 260, 270: | side surface |
| 280: | corner |
| 290: | end portion |
| 300: | positioning member |
| 310: | fixed point |
| 310p: | fluid passage |
| 320: | continuous opening |
| 330: | flow path |
| 340: | clear space |
| 350: | cavity |
| 360: | bypass |
| 370, 380: | groove |

The invention claimed is:

1. A battery housing for accommodating a battery cell and including a bottom portion, the battery housing comprising:
    an absorbent layer disposed on the bottom portion in the battery housing; and
    a corrugated insulating film disposed on the absorbent layer,
    wherein the insulating film is partially fixed to the absorbent layer by an adhesive or by welding,
    wherein the absorbent layer comprises an exposed section that is not covered by the insulating film, and
    wherein fluid passages are respectively provided along the insulating film above the absorbent layer, below the absorbent layer, and between two fixed sections for affixing the insulating film and the absorbent layer.

2. The battery housing of claim 1, wherein the insulating film comprises a groove opened toward the absorbent layer.

3. The battery housing of claim 2, wherein a cross-section of the insulating film perpendicular to a longitudinal direction of the groove has a zigzag shape.

4. The battery housing of claim 1, wherein the battery housing comprises a reinforcement member disposed on the bottom portion, and
    wherein the reinforcement member forms a continuous opening.

5. The battery housing of claim 4, wherein the insulating film comprises a groove that is opened toward the absorbent layer, and
    wherein the continuous opening is connected to the groove in a fluid-conductive manner.

6. The battery housing of claim 4, wherein the insulating film covers the reinforcement member.

7. The battery housing of claim 4, wherein an open space is provided between the continuous opening and the absorbent layer.

8. The battery housing of claim 4, wherein the reinforcement member comprises at least two or more reinforcement members, and
    wherein the absorbent layer is disposed between two of the reinforcement members.

9. The battery housing of claim 8, wherein the insulating film comprises at least two or more insulating films,
    wherein a first one of the insulating films covers a first one of the reinforcement members,
    wherein a second one of the insulating film covers a second one of the reinforcement members, and
    wherein a portion of the absorbent layer is not covered by the insulating films.

10. A battery module comprising the battery housing of claim 1.

11. A vehicle comprising the battery module of claim 10.

12. A battery housing for accommodating a battery cell and including a bottom portion, the battery housing comprising:
- an absorbent layer disposed on the bottom portion in the battery housing; and
- a corrugated insulating film disposed on the absorbent layer,
- wherein the insulating film is partially fixed to the absorbent layer,
- wherein the absorbent layer comprises an exposed section that is not covered by the insulating film, and
- wherein fluid passages are respectively provided along the insulating film above the absorbent layer, below the absorbent layer, between two fixed sections for affixing the insulating film and the absorbent layer, and between the insulating film and the absorbent layer.

* * * * *